United States Patent [19]

Monks

[11] 4,160,391

[45] Jul. 10, 1979

[54] AUXILIARY DRIVE MECHANISM

[75] Inventor: Harry Monks, Burton-on-Trent, England

[73] Assignee: Coal Industry (Patents) Limited, London, England

[21] Appl. No.: 753,471

[22] Filed: Dec. 22, 1976

[30] Foreign Application Priority Data

Jan. 15, 1976 [GB] United Kingdom ............... 01572/76

[51] Int. Cl.² .............................................. F16H 37/06
[52] U.S. Cl. .................................... 74/661; 192/4 R; 74/665
[58] Field of Search ............................ 74/661, 665 B; 192/114 R, 4 R

[56] References Cited

U.S. PATENT DOCUMENTS

| | | | |
|---|---|---|---|
| 2,451,598 | 10/1948 | Wilson | 74/665 B |
| 3,863,522 | 2/1975 | Gibson et al. | 74/665 B X |

*Primary Examiner*—Benjamin W. Wyche
*Assistant Examiner*—Frank H. McKenzie, Jr.
*Attorney, Agent, or Firm*—James C. Wray

[57] ABSTRACT

An auxiliary drive mechanism for use in association with a hydraulically actuated clutch has a gear wheel attached to the driven or output stage of the clutch, and a drive motor driving a pinion meshing with an intermediate gear. The intermediate gear protrudes into the casing which houses the clutch and can selectively engage the gear wheel. The auxiliary drive mechanism finds application where it is at times necessary to provide a drive at a speed lower than normal operating speed, for example to tension the chain of a scraper chain conveyor.

1 Claim, 1 Drawing Figure

U.S. Patent
Jul. 10, 1979
4,160,391
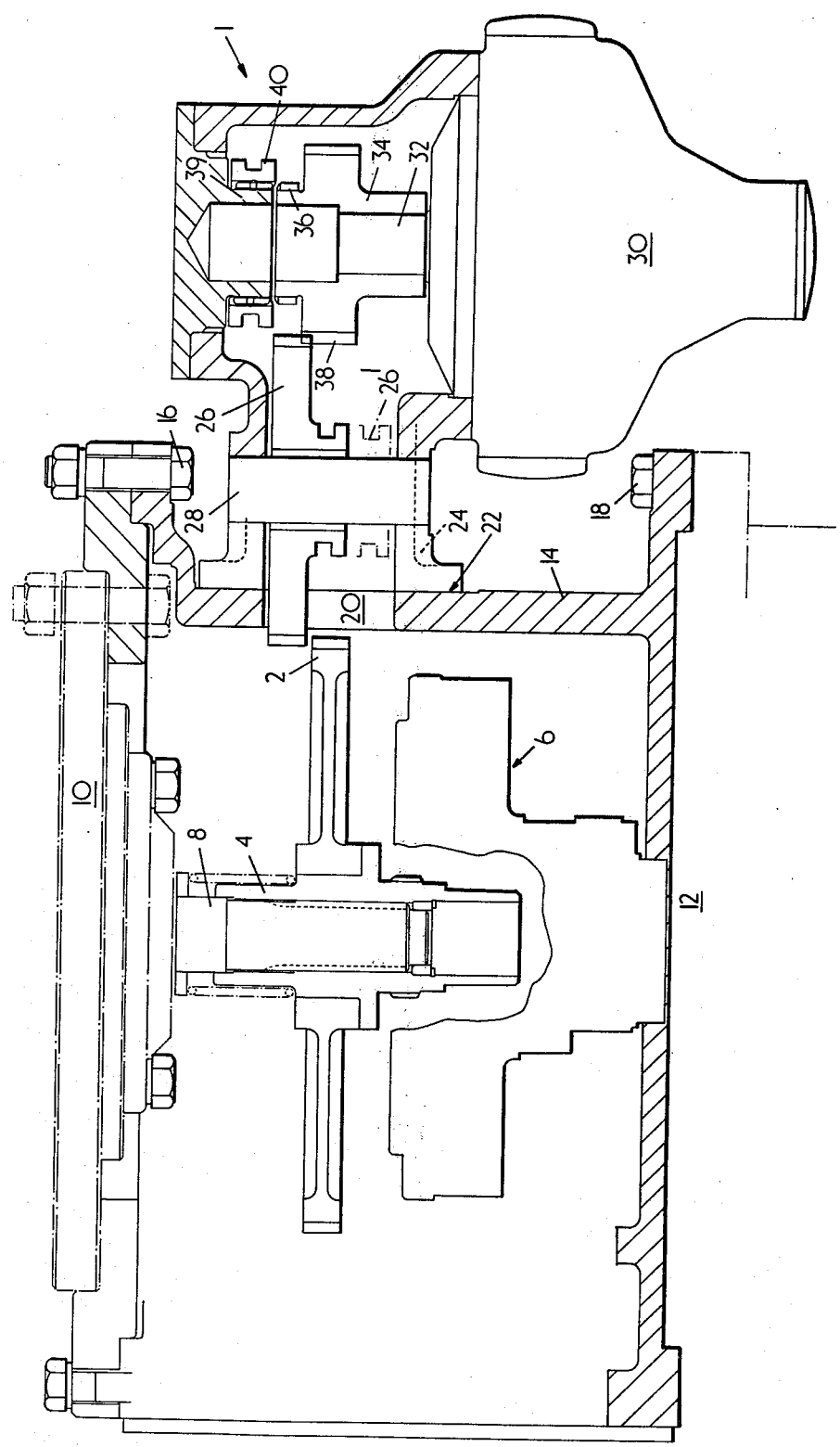

AUXILIARY DRIVE MECHANISM

This invention concerns an auxiliary drive mechanism. In particular, the present invention has reference to a drive mechanism for use in conjunction with a hydraulically actuated clutch such as that disclosed in our co-pending U.S. Patent Application No. 642,678 now U.S. Pat. No. 4,039,057. A hydraulically actuated clutch of this type finds especial, although not exclusive, application in a drive assembly for a conveyor installed along a working face in an underground mine. The conveyor generally comprises at least one chain carrying or inter-connecting a plurality of flight bars and it is at times necessary to tension or slacken the chain for either installation or repair. For this purpose, it is desirable to run the conveyor at a lower speed than that normally employed during operation.

It is therefore an object of this invention to provide an auxiliary drive mechanism in association with a hydraulically actuable clutch which will enable in use the driven stage of the clutch to be driven at a lower speed than its normal operating speed.

Accordingly the invention provides an auxiliary drive mechanism comprising a member fixedly mounted on the driven stage of a hydraulically actuated clutch, an auxiliary drive motor, and connection means for selectively engaging or disengaging drive between the motor and the member.

The member is conveniently a gear wheel and the motor includes a pinion mounted on its output shaft. The connection means advantageously comprises an intermediate gear interposed between the gear wheel and the pinion, the gear being selectively movable into or out of meshing engagement with the gear wheel and/or pinion.

The clutch is conveniently housed within a casing, the motor being mounted on the casing.

By way of example only, one embodiment of an auxiliary drive mechanism according to the invention is described below with reference to the accompanying drawing which is a sectional plan view.

Referring to the drawing, an auxiliary drive mechanism is indicated generally at 1 and includes a member in the form of a gear wheel 2 fixedly mounted on a driven stage 4 of a hydraulically actuated clutch depicted at 6, the driven stage 4 being drivably connected to an input shaft 8 of a gearbox 10. The driving stage of the clutch 6 is connected to a motor 12, for example an electric motor.

The clutch 6 is housed within a casing 14 which is detachably securable by, for example, bolts 16, 18 to the gearbox 10 and motor 12 respectively. The casing 14 has an aperture 20 and a mounting 22 circumjacent thereto. A housing 24 is attached to the casing 14 and contains an intermediate gear 26 rotatably mounted on and slidable along a shaft 28 secured in the housing 24 and extending parallel or substantially parallel with the axis of the driven stage 4. The gear 26 extends partially into casing 14 through aperture 20 for engagement with gear wheel 2. Mounted on the housing 24 is an auxiliary motor 30, in this example a hydraulic motor having an output shaft 32 carrying a stepped pinion 34 provided with sets 36, 38 of teeth, the set 38 meshing with the intermediate gear 26. The housing 24 has an externally splined stub shaft 39 disposed in axial alignment with the pinion 34. An internally splined locking member 40 is engaged with the stub shaft 39 for sliding movement relative thereto and for a purpose to be indicated later in the specification.

The operation of the hydraulically actuated clutch 6 is effected by control means (not shown) which are described and claimed in our copending U.S. patent application No. 642,678, and British patent application No. 00260/75.

The operation of the auxiliary drive mechanism 1 is as follows. With the intermediate gear 26 in the position shown in full lines in the drawing, the drive between the motor 30 and the gear wheel 2 is disengaged since the gear 26 is out of mesh with the wheel 2. When it is necessary to rotate the driven stage 4 of the clutch 6 and thus the input shaft 8 of gearbox 10, which may be connected to a conveyor (not shown) of the armoured flexible type, the intermediate gear 26 is brought into engagement as shown at 26[1] with the wheel 2 by means of a selector fork (not shown), the locking member 40 being retained in the disengaged position shown in full lines in the drawing. In moving the intermediate gear into this position indicated by 26[1] an electrical circuit to the motor 12 is broken thus ensuring that the motor 12 cannot be run when the auxiliary drive mechanism is to be actuated. Once the gear 26 is meshed with the wheel 2, the drive train between the pinion 34 mounted on the auxiliary motor shaft 32 is established. Upon actuation of the motor 30, the driven stage 4 of clutch 6, and thus the shaft 8 of the gearbox 10 is rotated.

When the driven stage 4 has been rotated by the auxiliary motor sufficiently to tension the conveyor chain a desired amount, the locking member 40 is moved to engage teeth 36 of the pinion 34 to lock the pinion 34 to the housing 24 to prevent counter rotation of the gear train which may tend to occur due to leakage of pressure fluid from the motor 30 which is switched off once the locking member is in its locked position.

Once the tensioned conveyor chain is connected the gear 26 is moved to the position indicated by the full line in the drawing to disengage the gear 2 and which thereby is free to rotate. In so moving the gear 26 the electrical circuit to the main drive motor 12 is re-established. Thus, the motor can be started to drive the conveyor in normal operational manner.

What is claimed is:

1. A conveyor chain tensioning and driving mechanism comprising a casing, an electrical chain drive motor mounted on the casing, a hydraulic clutch mounted within the casing and having a driving stage connected to be driven by the chain drive motor, and having a driven stage, a gear box having an input shaft drivingly connected to the driven stage of the hydraulically actuated clutch and having an output driving a conveyor chain, a gear wheel fixedly mounted on the driven stage of the clutch and positioned within the casing, the casing having an aperture, a housing having a mounting connected to the casing aroud the aperture, a shaft secured to the housing, an intermediate gear rotatable on and slidable along the shaft and extending through the aperture to drivingly engage the gear wheel, the intermediate gear being adapted for selective sliding into or out of meshing engagement with the gear wheel, means for sliding the intermediate gear, an auxiliary motor mounted on the housing and having an output shaft extending into the housing, a stepped pinion mounted on the output shaft for rotatation therewith, the pinion having first teeth for engaging the intermediate gear and having a second teeth, a stub shaft mounted in the housing in axial alignment with the auxiliary motor output shaft and having splines, an internally splined locking member slidable on the stub shaft for engaging the splines and the second teeth on the pinion and locking the pinion, whereby when the intermediate gear is slid into driving engagement with the pinion first teeth and the gear wheel, the auxiliary motor drives the gear wheel and gear box input shaft and gear box for tensioning a chain driven by the gearbox and whereby when the locking member is slid into engagement with the second teeth on the pinion, the pinion, intermediate gear, gear wheel input shaft gearbox and conveyor chain are held fixed, whereupon the intermediate wheel may be slid out of engagement with the gear, an electrical circuit connected to the chain drive motor, and circuit braking means connected to the circuit and connected to the intermediate gear sliding means for breaking the circuit to the chain drive motor when the intermediate gear sliding means slides the intermediate gear into engagement with the gear wheel and for re-establishing the circuit when the intermediate gear is slid out of engagement within the gear wheel.

* * * * *